United States Patent [19]

Hube et al.

[11] Patent Number: 5,119,079
[45] Date of Patent: Jun. 2, 1992

[54] TOUCH SCREEN USER INTERFACE WITH EXPANDING TOUCH LOCATIONS FOR A REPROGRAPHIC MACHINE

[75] Inventors: Randall R. Hube, Rochester; Craig W. Jacobs, Fairport; William J. Moon, Marion, all of N.Y.

[73] Assignee: Xerox Corporation, Stamford, Conn.

[21] Appl. No.: 583,923

[22] Filed: Sep. 17, 1990

[51] Int. Cl.⁵ .............................................. G09G 3/02
[52] U.S. Cl. ..................................... 340/712; 340/731
[58] Field of Search ............... 340/712, 706, 731, 721, 340/723; 178/18, 19; 382/47

[56] References Cited

U.S. PATENT DOCUMENTS

| | | | |
|---|---|---|---|
| 4,267,443 | 5/1981 | Carroll et al. | 250/221 |
| 4,299,041 | 11/1981 | Wilson | 40/124.1 |
| 4,310,839 | 1/1982 | Schwerdt | 340/712 |
| 4,332,464 | 6/1982 | Bartuus et al. | 355/14 C |
| 4,587,520 | 5/1986 | Astle | 340/712 |
| 4,587,630 | 5/1986 | Straton et al. | 364/900 |
| 4,686,332 | 8/1987 | Greanias et al. | 178/19 |
| 4,755,811 | 7/1988 | Slavin et al. | 340/731 |
| 4,821,030 | 4/1989 | Batson et al. | 340/712 |

Primary Examiner—Alvin E. Oberley
Assistant Examiner—Xiao Min Wu
Attorney, Agent, or Firm—Mark Costello

[57] ABSTRACT

A touch sensitive user interface of the type having a display screen for displaying an image; control logic responsive to the touch sensitive user interface for determining the contact position of a probe, such as a finger, thereon; a display menu of operating features, represented by a plurality of images on the display screen, so that a user may make touch selections on the images corresponding to operating features desired; a system controller for identifying a contact zone of a predetermined size with respect to the display screen, the control logic actuating the feature within the system represented by a displayed image in response to user touch within a corresponding contact zone, the system controller enlarging the contact zone of a selected feature upon selection thereof, to a size accommodating a probe tip, without overlapping on adjacent areas and upon completion of option selection, returning the expanded contact areas to said predetermined size.

6 Claims, 13 Drawing Sheets

TOUCH SCREEN USER INTERFACE WITH EXPANDING TOUCH LOCATIONS FOR A REPROGRAPHIC MACHINE

This invention relates generally to the use of a touch screen user interface on a reprographic machine, and in particular, to a method of expanding the area for selection on the touch screen to improve accuracy of selection thereof.

INCORPORATION BY REFERENCE

U.S. Pat. No. 4,267,443 to Carroll et al. in specifically incorporated by reference herein by for the purpose of background information of the type of touch sensitive screen contemplated by the present invention.

BACKGROUND OF THE INVENTION

Touch sensitive screen user interfaces facilitate the selection of copying parameters on a reprographic system. Such systems allow users to visually determine the copying feature set that has been selected prior to starting the job, as well as, the status of the job during execution. Touch sensitive screen user interface systems, currently available on the market, employ a series of programming menus, whereby the copy features are selected by touching the desired feature icons contained on the display screen.

The most commonly used pointing device used for selection of features on a touch sensitive screen is a finger. Due to the size of the average finger, and errors in positioning the finger, it has been found necessary to construct menus of selectable features using relatively large touch sensitive zones for each selectable item on the menu. Typically these areas have minimum dimensions on the order or ½ to ¾ inches ("finger resolution"). When combined with a rather limited display area, there is only a limited number of items that can be simultaneously displayed for possible selection on a specific display frame. It would be desirable to provide a greater number of items for selection, but reducing the sensitive zones to less than finger resolution results in difficulty in making selections due to the relative inaccuracy of positioning a large finger on a small area, including uncontrollable finger movement and inaccurate hand placement. Placement of the probe centered near the edge of the selection area may result in a toggling action as the finger is inadvertently and unconsciously moved between selections. Of course, the smaller the selection area, the nearer to an edge the probe must be placed. It would be desirable to avoid accidental selection of a feature due to relatively small, inadvertent or unconscious movement of the finger or probe.

U.S. Pat. No. 4,332,464 to Bartulis et al. discloses a user interface for a copying machine, comprising a video display and a touch sensitive device capable of detecting user requests via touching of the display surface. Moreover, the user interface is used to display visual elements representative of the feature set currently selected, including, optional feature selections that are available. U.S. Pat. No. 4,587,630 to Straton et al. discloses an intelligent programmable touch screen system which uses a cursor to provide feedback to a user. A means is provided for the system to correctly interpret a finger position and change it into a screen position. U.S. Pat. No. 4,587,520 to Astle discloses a cursor controlled page selection system using a cursor which can have a variety of physical characteristics. This system makes use of a joystick, which is tracked by a cursor. U.S. Pat. No. 4,310,839 to Schwerdt discloses an interactive display system with touch data entry which uses touch switches and cursors to highlight a selection by inverting the entire selection. U.S. Pat. No. 4,686,332 to Greanias et al. discloses a finger touch detection system which calculates a screen position from a finger position. A touch cursor tracks the movement of the finger. U.S. Pat. No. 4,299,041 to Wilson shows a touch sensitive greeting card in which activation commences operation of an effects generator causing a change of appearance in a display. U.S. Pat. No. 4,755,811 to Slavin et al. shows an arrangement for touch controlled zoom of an image on a waveform display. Statutory Invention Registration H716 by MacDonald et al. shows a touch sensitive screen in which selection problems associated with parallax are remedied by placing a guard band around each touch sensitive area corresponding in size to an amount of parallax error. The patents and publications cited herein are incorporated by reference for their teachings.

SUMMARY OF THE INVENTION

In accordance with the invention, there is provided a touch sensitive user interface which provides an increase in the size of the touch sensitive zone upon selection thereof, which allows certain selection of only a single touch sensitive zone and therefore, a single feature selection.

In accordance with one aspect of the invention, in a device such as an electrophotographic imaging system, including a touch sensitive user interface of the type having a display screen for displaying an image; control logic responsive to the touch sensitive user interface for determining the contact position of a probe, such as a finger, thereon; a display menu of operating features, represented by a plurality of images on the display screen, so that a user may make touch selections on the images corresponding to operating features desired; a system controller for identifying a contact zone of a predetermined size with respect to the display screen, the system controller actuating the feature within the system represented by a displayed image in response to user touch within a corresponding contact zone, acknowledging selection of one of the image-represented features by displaying it in a highlighted fashion the system controller enlarging the contact zone of a selected feature upon selection thereof, to a size accommodating a probe tip, without overlapping on adjacent areas.

In accordance with another aspect of the invention, contact positions in the region adjacent to the one or more activated selections are also increased in area, so that a user, in moving the probe within the region of contact, is able to select a single image, represented by a highlighted image, without overlapping contact.

These and other aspects of the invention will become apparent from the following description used to illustrate a preferred embodiment of the invention in conjunction with the accompanying drawings in which:

Figure 1:
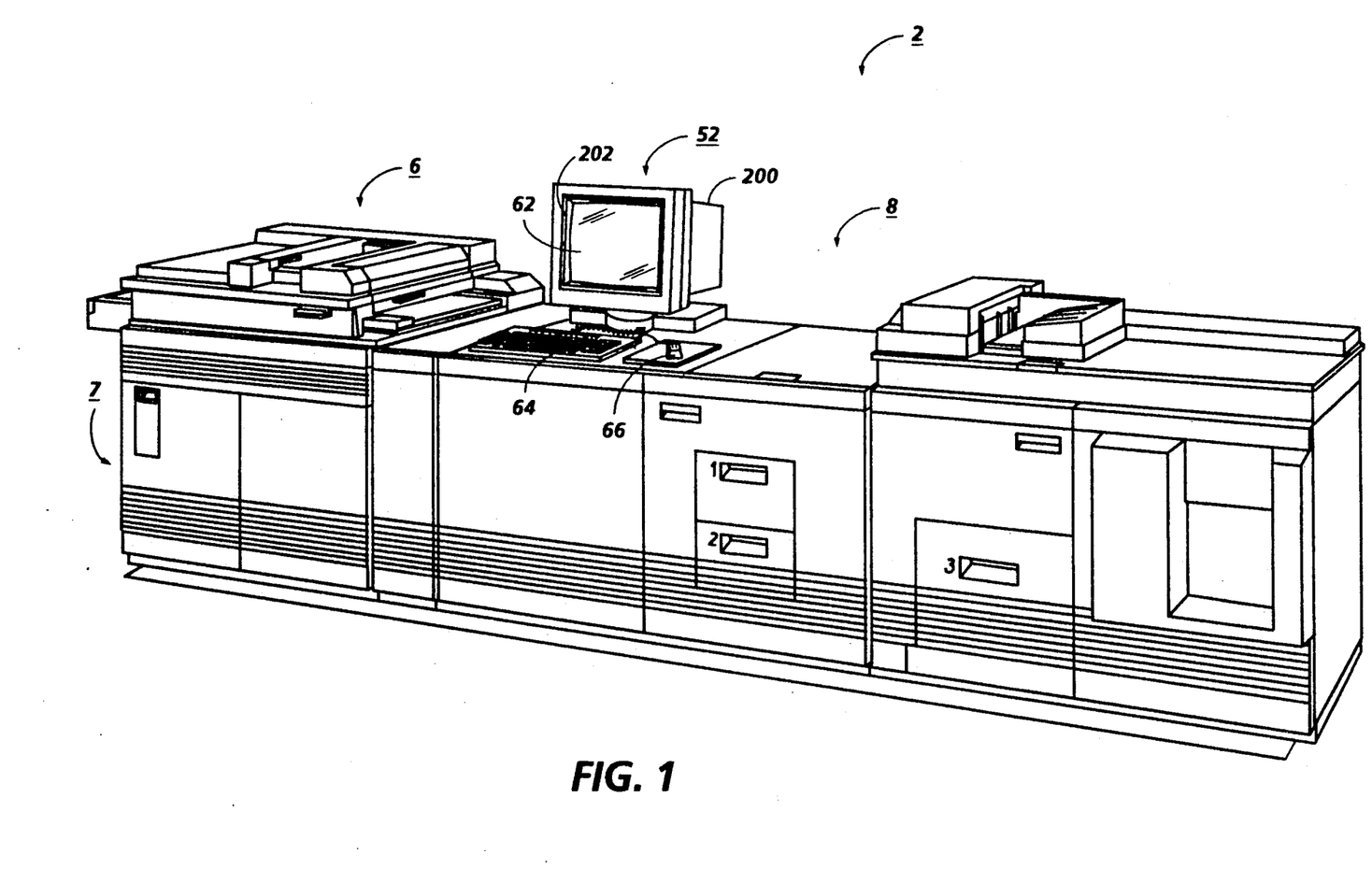
FIG. 1 is an isometric view of an illustrative xerographic reproduction machine incorporating the present invention.
Figure 2:
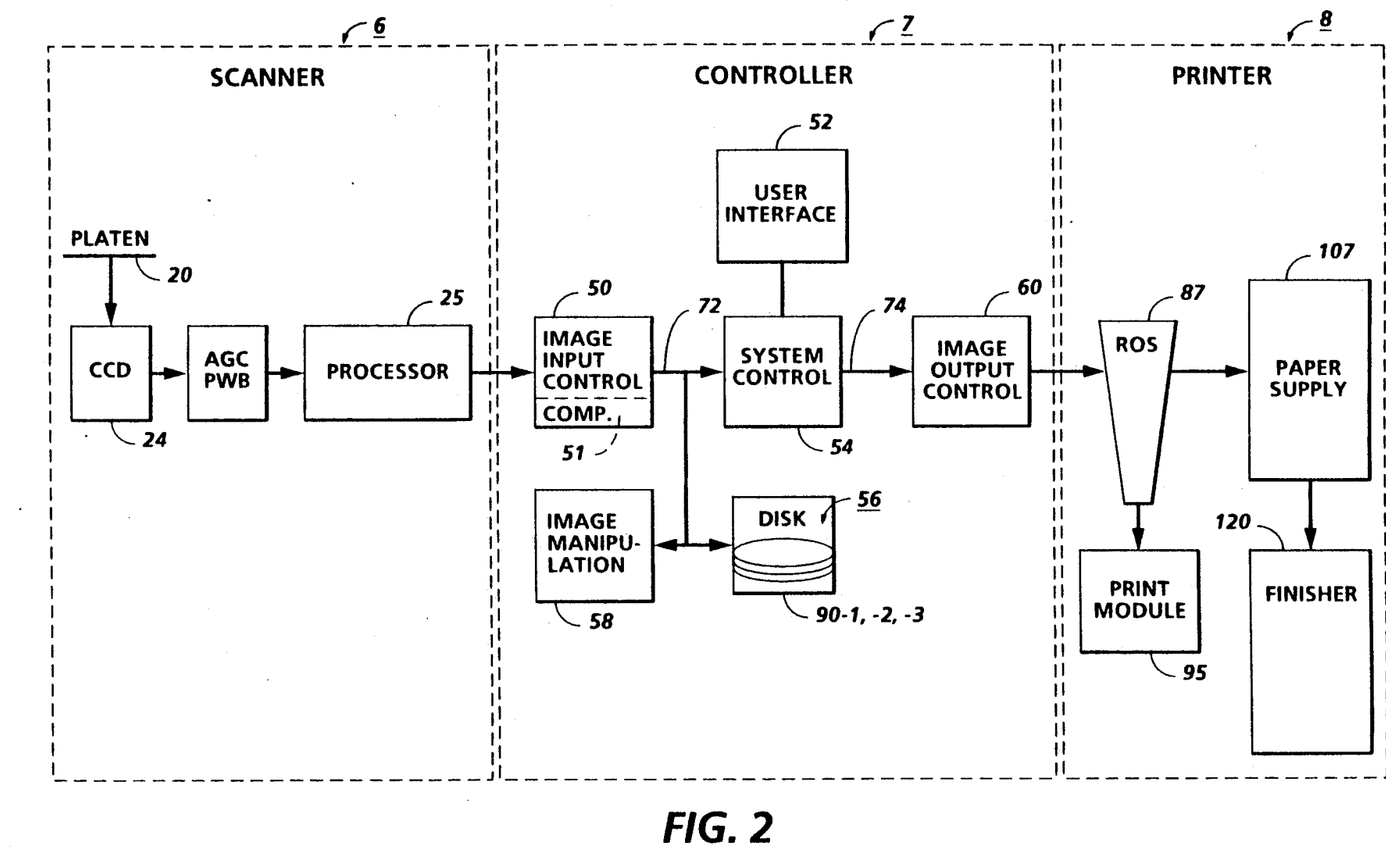
FIG. 2 is a block diagram depicting the major elements of the printing system shown in FIG. 1.

With reference to the drawings, where the showings are for the purpose of illustrating an embodiment of the invention and not for the purpose of limiting same, at FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
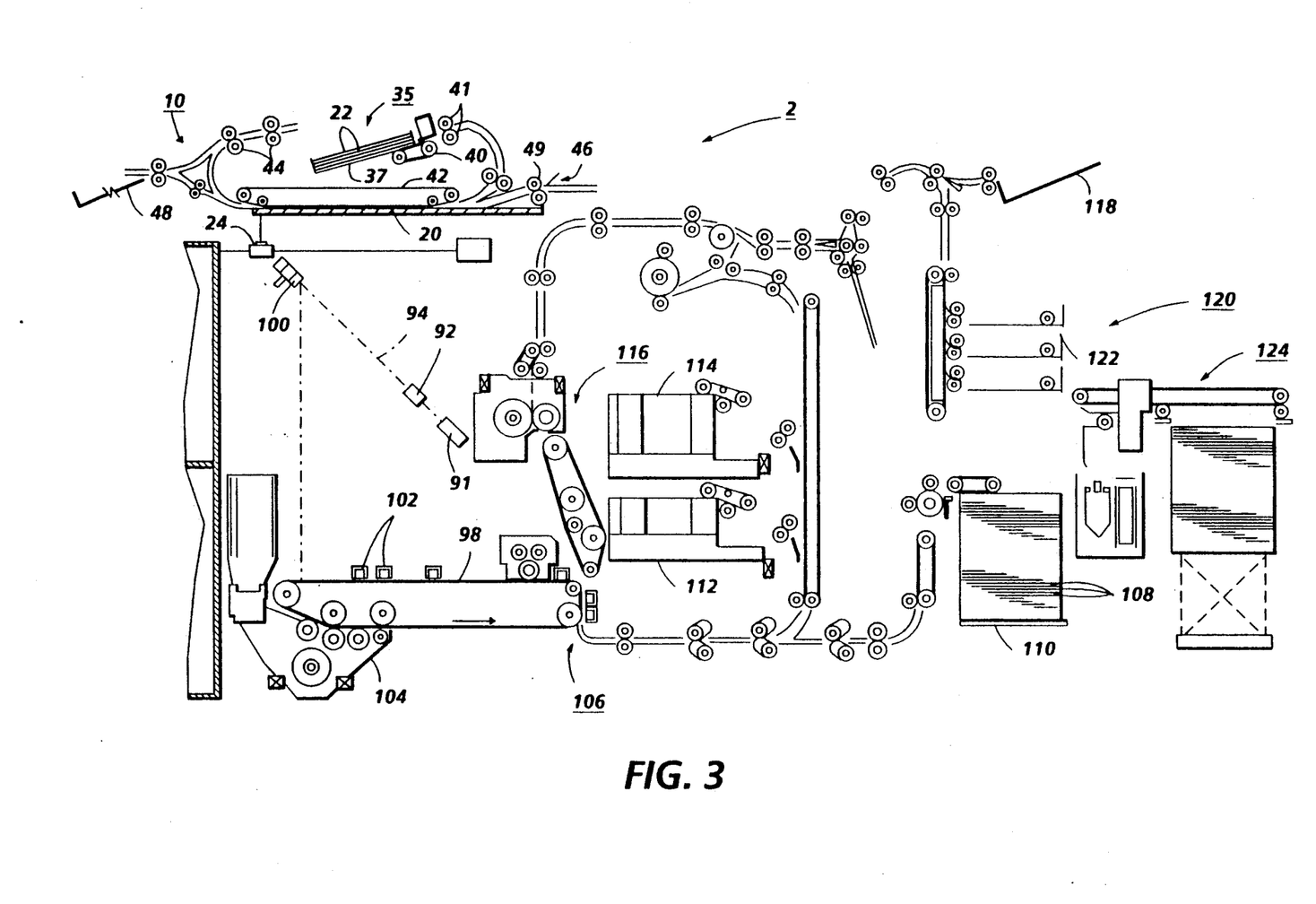
FIG. 3 is a plan view illustrating the principal mechanical components of the printing system shown in FIG. 1.
Figure 4:
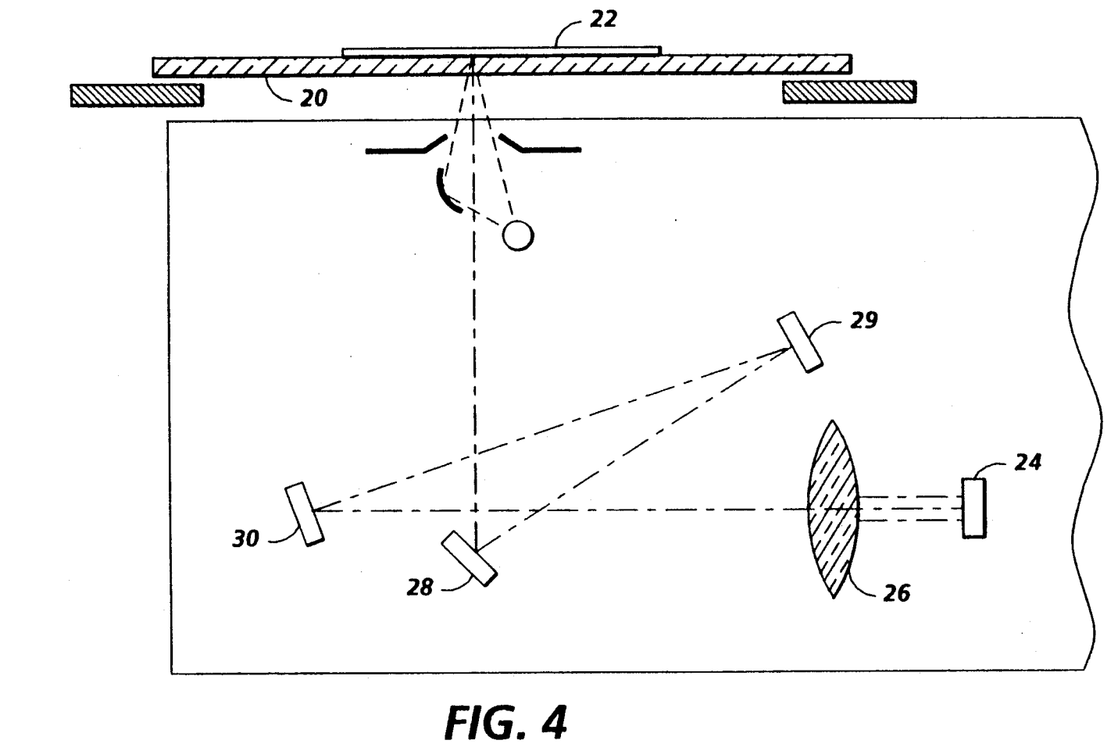
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 27 and mirrors 28, 29, 30 cooperate to focus array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital, and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADH) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer, and for purposes of explanation, is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by charging devices 102 at a charging station preparatory to exposure by imaging beams 94. The latent electrostatic images are developed by developer 104 and transferred at transfer station 106 to a print media 108 delivered by Paper Supply section 107. Media 108 may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Figure 5A:
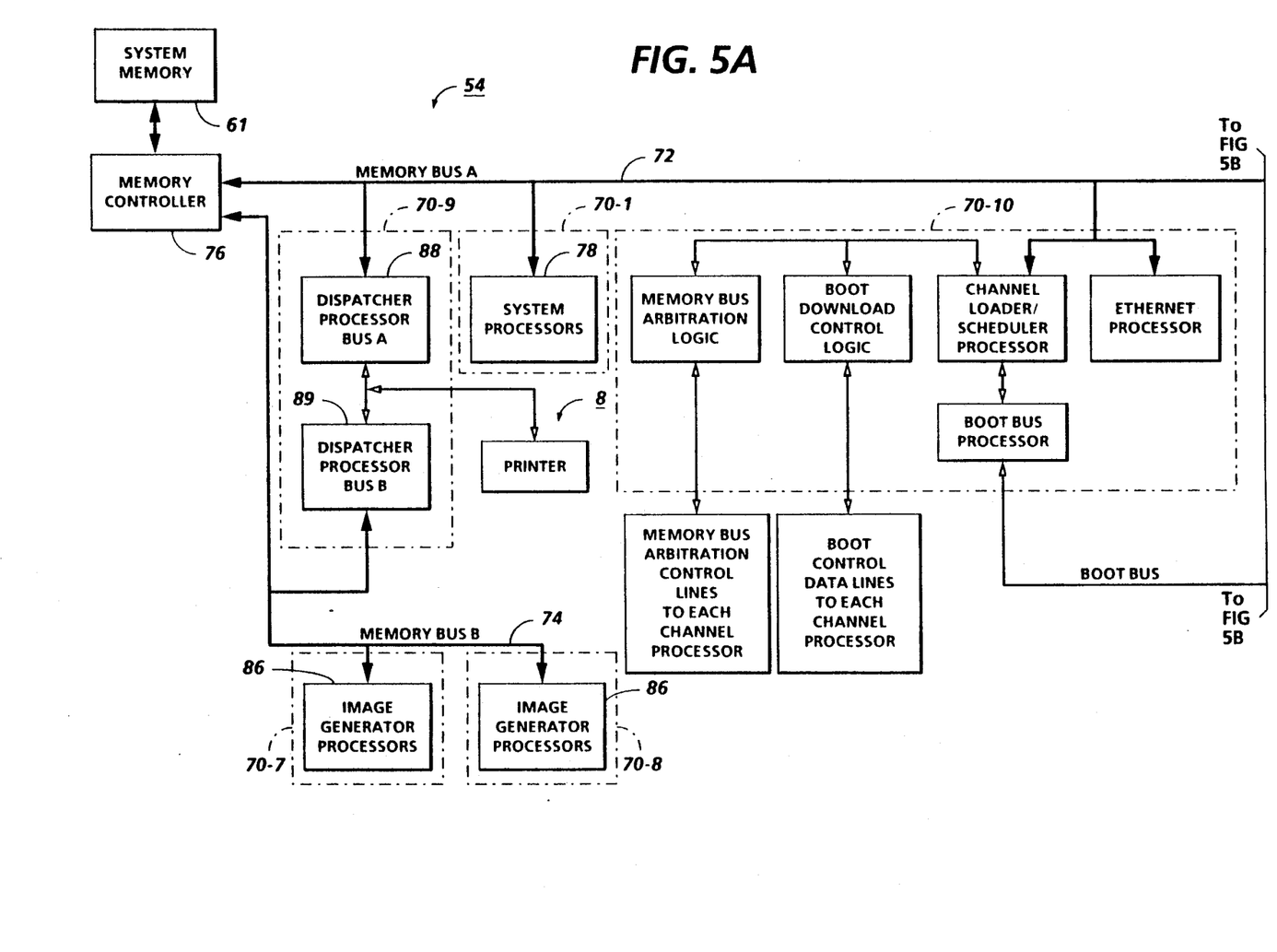
FIGS. 5A, 5B, and 5C comprise a schematic block diagram showing the major parts of the control section for the printing system shown in FIG. 1.
Figure 5B:
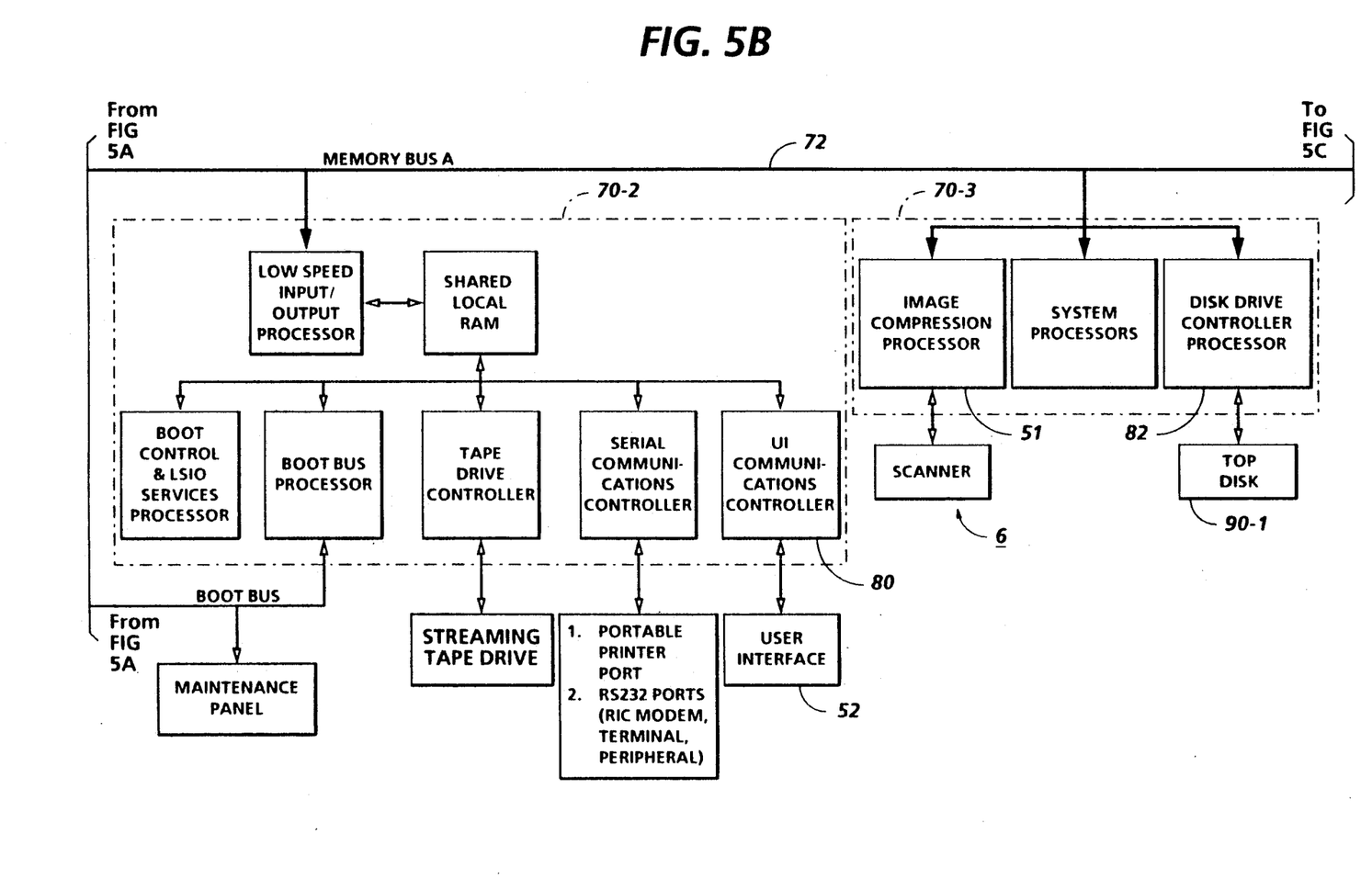
Figure 5C:
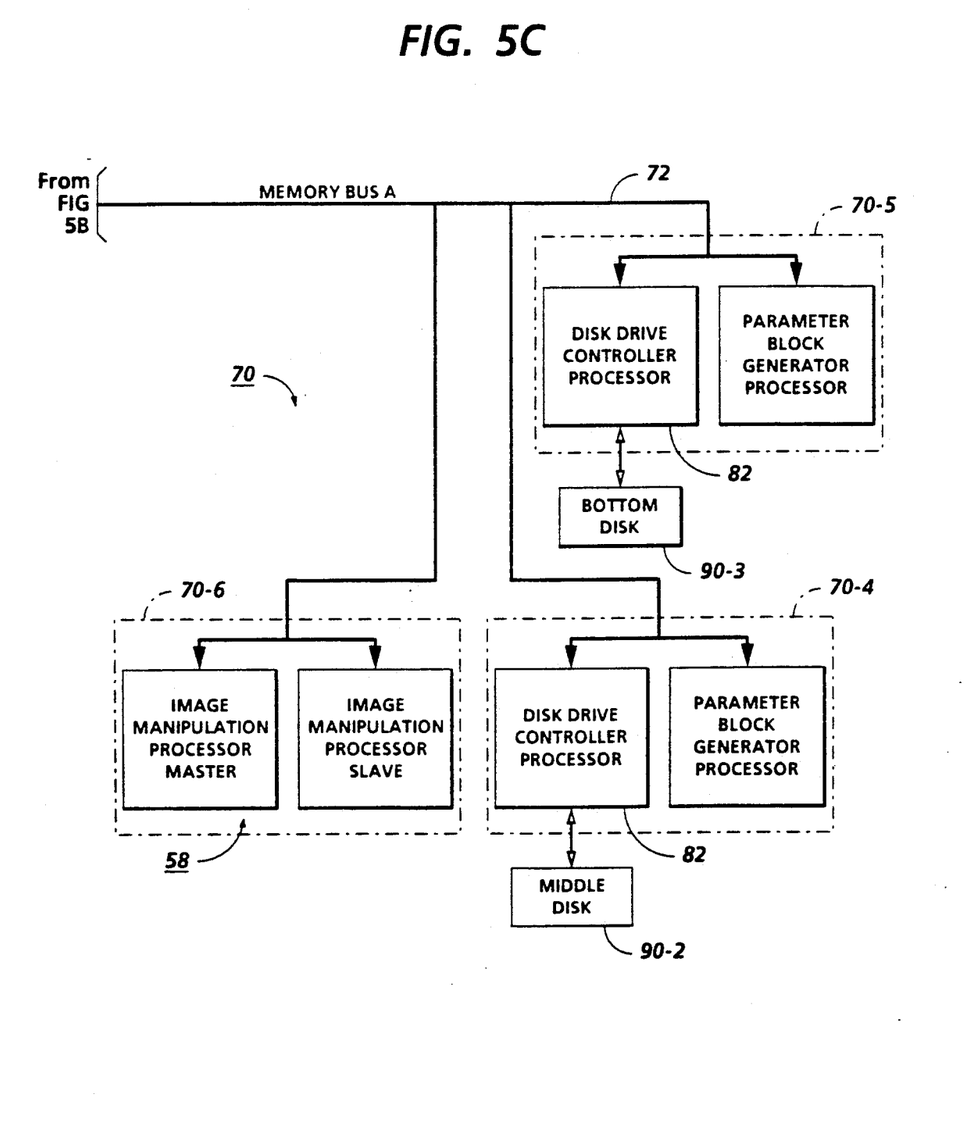

Referring to FIGS. 1, 2 and 5, controller section 7 is, for explanation purposes, divided into an image input controller 50, User Interface (UI) 52, system controller 54, main memory 56, image manipulation section 58, and image output controller 60.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touch sensitive screen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse. A similar user interface is described in U.S. Pat. No. 4,267,443, issued May 12, 1981 to Carroll et al., the relevant portions thereof being hereby incorporated by reference into the present application. Generally, operation and control information is stored in system memory and accessed by the system controller when necessary. The system controller regulates the operation of the machine based on user programming of desired features, and the system status, as determined by conventional switches and sensors. The features within the machine are then regulated through the control of individual electrical and electromechanical devices, such as conventional servomotors, solenoids, etc.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
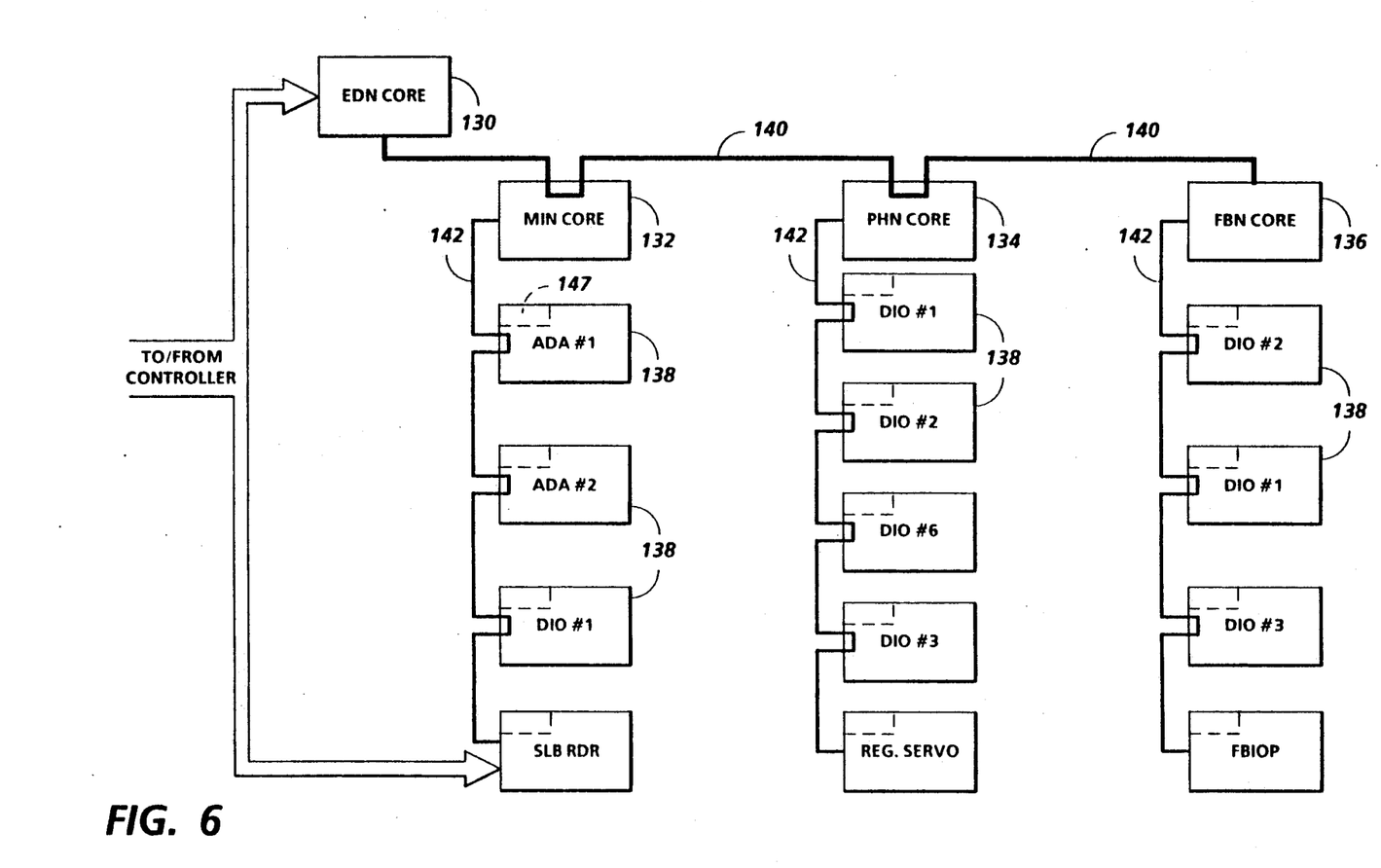
FIG. 6 is a block diagram of the Operating System, together with Printed Wiring Boards and shared line connections for the printing system shown in FIG. 1.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Figure 7:
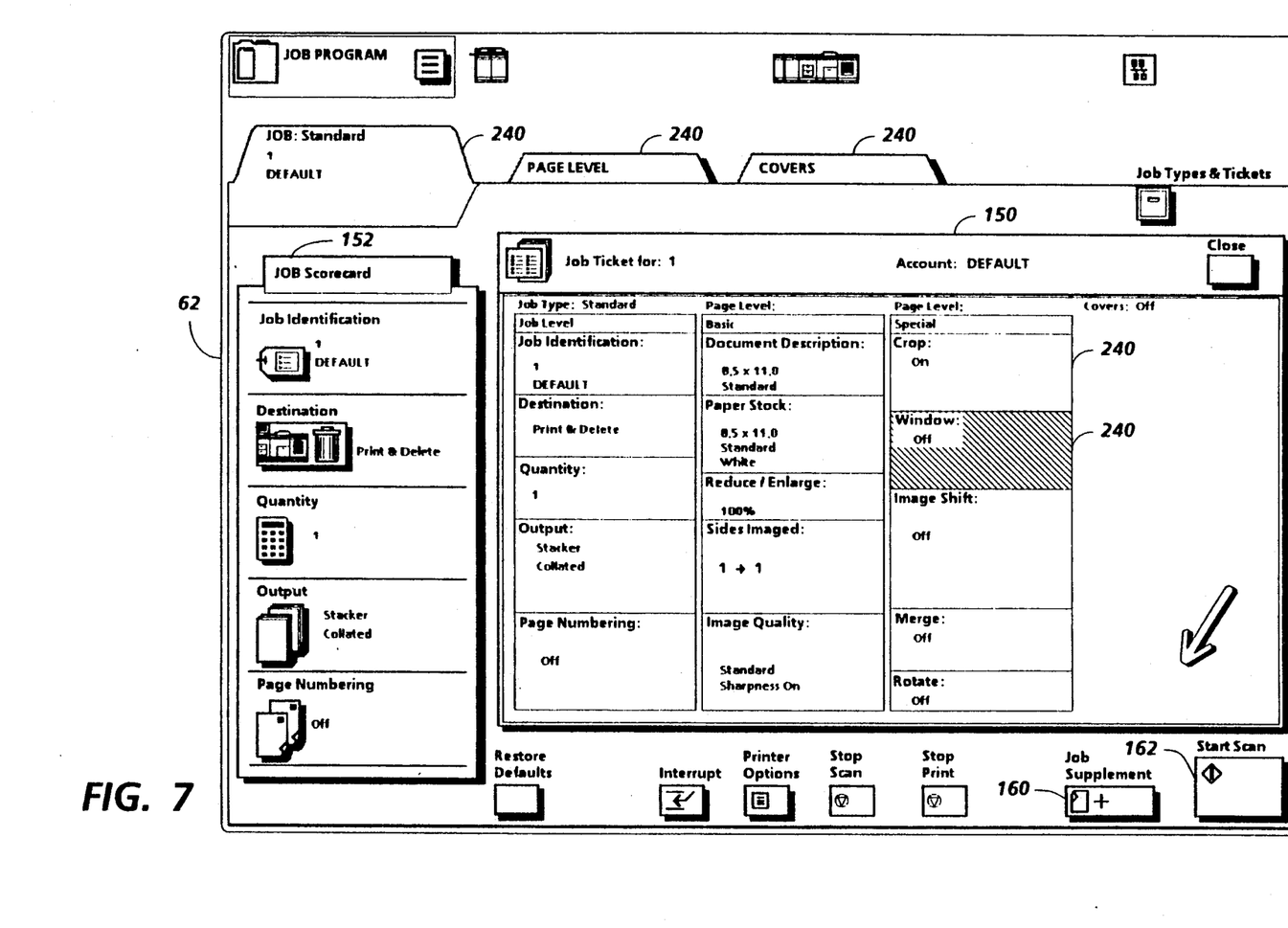
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on display 62 with menus 150, 152, which display the basic instructions to the system for printing the job.

Referring again to FIGS. 1, 2, and 7, user interface 52 is comprised of U/I housing 200, touch sensitive display 62, touch sensor 202, and keyboard 64. User programming of the machine via the U/I is facilitated through display of programming screens 150, such as shown in FIG. 7, which represent programming features of the machine. Signals from touch sensor 202 are fed to the machine controller 54 where they are interpreted with respect to the current programming screen. Subsequently user selections are displayed on CRT display 62 and the appropriate machine subsystems are enabled, disabled or adjusted accordingly.

Programming screen menus 150, 152, as displayed on CRT display 62, are used by the user to select a feature set appropriate for the completion of a printing job. Specifically, the programming screens consist of a series of screens, arranged in a file folder or tab format, as illustrated in FIG. 7. The currently programmed feature set is displayed with selected features indicated as highlighted or white icons and disabled or deselected feature icons are indicated with a neutral or grey background.

Figure 8:
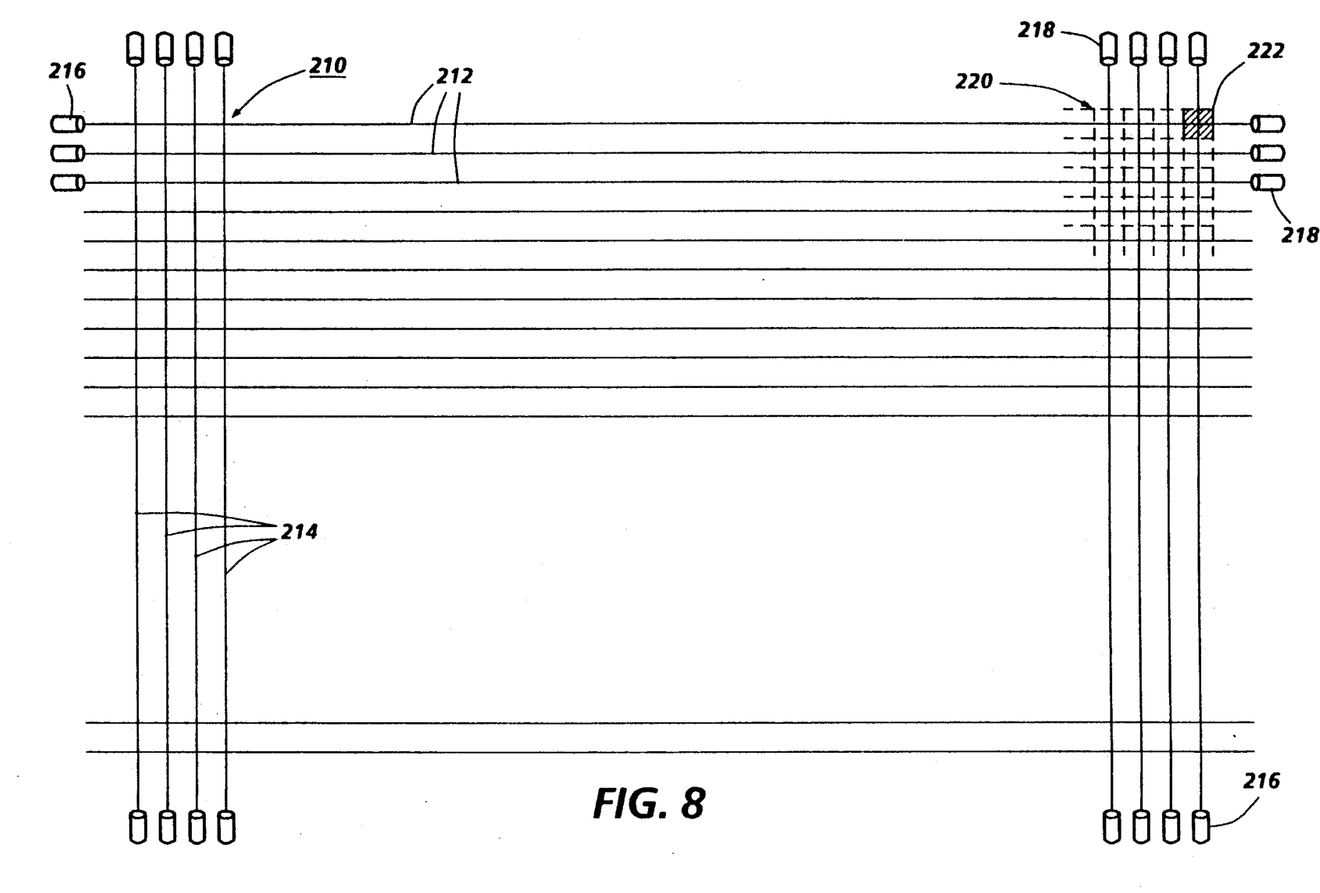
FIG. 8 is an illustration of the touch screen sensing grid and image display cells of the user interface of FIG. 2.

Referring now to FIG. 8, which illustrates the relationship between the touch sensitive display 62 and touch sensor 202, a regular rectangular grid 210 is formed by the intersection of horizontal light beams 212 and vertical light beams 214. Light, in the visible or infrared spectrum, emanating from light sources 216, is directed towards photodetectors 218 located on sides directly opposite the light sources, so as to form distinct light source-photodetector pairs, hereinafter referred to as source-detector pairs. The light beams defined by the source-detector pairs are used to detect the presence of a user's finger, or other such probe, in close proximity to the display screen. The probe is detected when one or more photodetectors is unable to detect the light beam which is normally incident upon it. The lack of an incident light beam causes the photodetector to alter its output signal, thereby indicating the presence of the probe. The user interface control electronics process the photodetector signals to provide an indication that a probe has been detected, as well as, the coordinate position of the center of the probe, both of which are output to the system controller. The actual control signal which enables selection of the feature is produced upon detecting the probe leaving contact with the screen, so that the last touched item is the selected one. Optionally concurrent feedback acknowledging the presence of the probe at the contact zone is provided by a visual indicator within said contact zone (including, but not limited to the display of a cross-hair, arrow, or cursor-like image) as well as optionally providing an audible indicator (including but not limited to: a simple tone, a complex tone, a musical note, a sequence of notes, a buzzer sound, a bell sound, a click sound).

Also illustrated in FIG. 8 is image display grid 220, composed of uniform rectangular cells 222. Display grid 220 is used to divide display screen 62, into display cells, the centers of which correspond with the intersection points of the horizontal and vertical light beams, 212 and 214 respectively. Division of the display screen in this manner defines the smallest possible cell or contact region that may be detected by the user interface, a region having dimensions defined by the spacing between adjacent photodetectors. Of course, probes smaller than the contact region are detectable, but most probes will be larger. The programming menus of FIG. 7, are designed so that user selectable feature images or icons confined within the boundaries are defined by one or more cells 222. Each feature is defined by a predetermined cell or cells covering an area corresponding approximately to the selection image or icon. Each of the feature selection areas has a set of representative icons 230, one of which is typically shown in a highlighted fashion to indicate the currently selected feature setting. Programming screen menus 150, 152 also contains user selectable feature menu tabs 240, to enable the user to select which menu of copying features is currently displayed on the screen. Each icon, button or tab is considered an active programming region, capable of providing visual feedback of its selection during normal feature programming operations. The remaining regions of programming screen 150, 152 are inactive regions, which normally provide no indication that a user's finger has contacted the user interface in this region.

Figure 9:
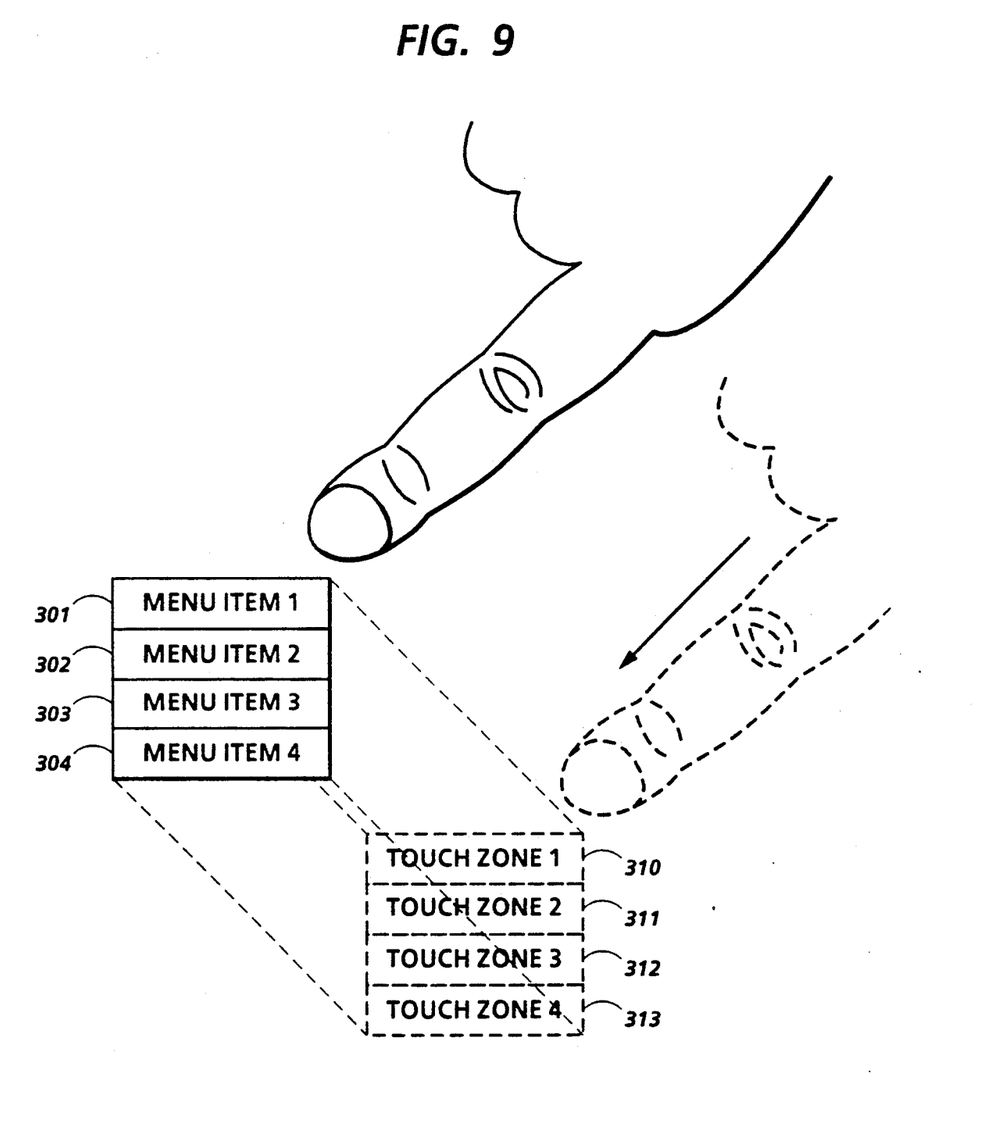
FIG. 9 is a simplified view of the menu and corresponding touch sensitive areas in normal condition.

As shown in the simplified menu of FIG. 9, which shows closely adjacent Menu Items 1, 2, 3, and 4 (numbered 301-304, respectively), corresponding in position and size to Touch Zones 1, 2, 3, and 4 (numbered 310-313, respectively), upon selection of an icon by a finger (with the same finger shown in solid lines touching the Menu Items on the display screen, and in dashed lines touching the corresponding Touch Zones to trigger detection by the source-detector pairs), which because of the size thereof, i.e., the small size of the touch zone area when compared to the relatively large size of the probe and it range of inadvertent movement, which is difficult to do.

Figure 10:
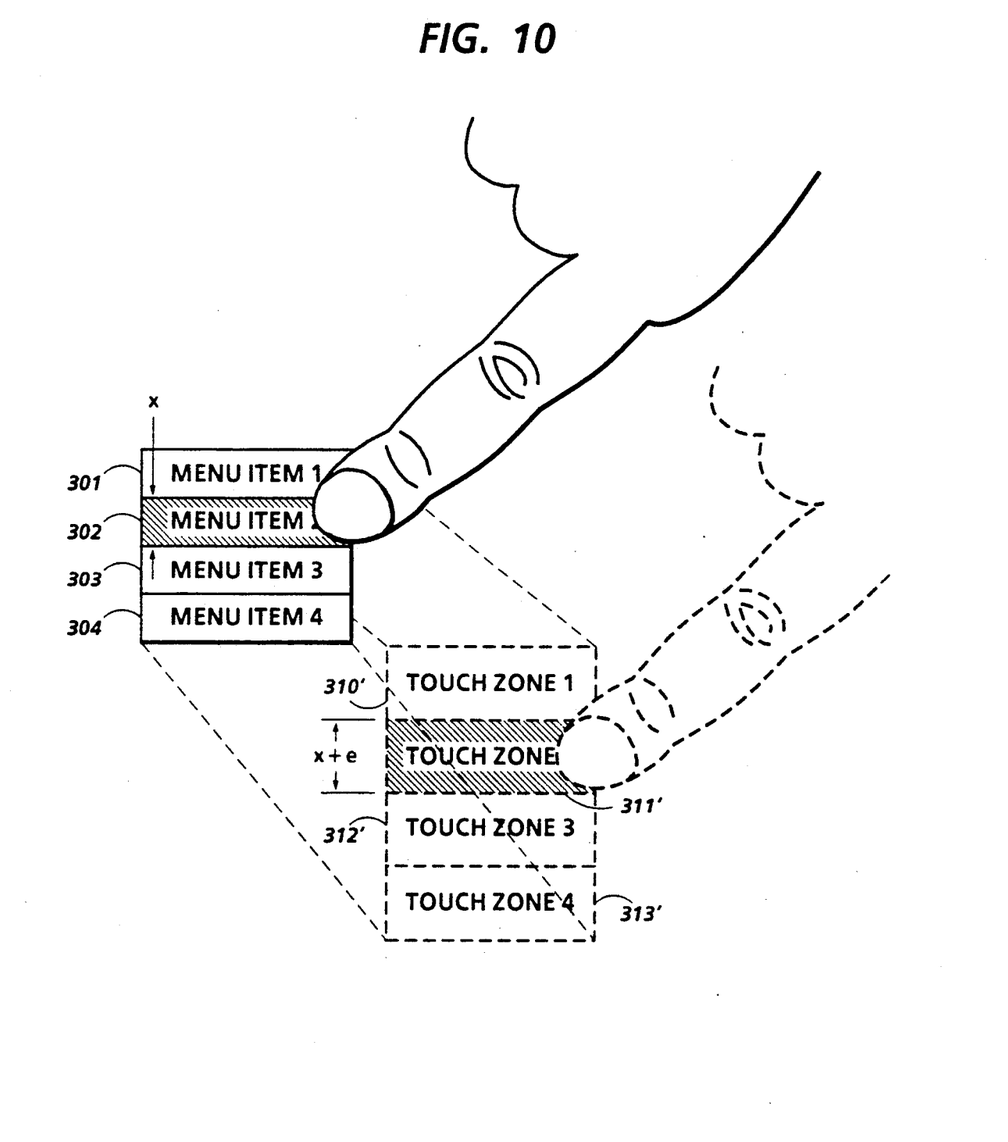
FIG. 10 is a simplified view of the menu and corresponding touch sensitive areas in expanded condition.

In accordance with the invention, and as shown in the simplified menu of FIG. 10, upon selection of any of menu items 301-304, having width "x", which because of the size thereof renders selection difficult, the touch zones which correspond to those icons are expanded to a width "x+e" so that a finger or other commonly used probe will comfortably fit within a single area, i.e., an area which corresponds to a single feature selection. Width "x+e" is selected so that the sweep of relatively small inadvertant and unconscious movements of the finger or probe, i.e., shaking or the like, are small with respect to the size of the expanded area. Of course, the touch are may expand in either width, height, or both.

Figure 11:
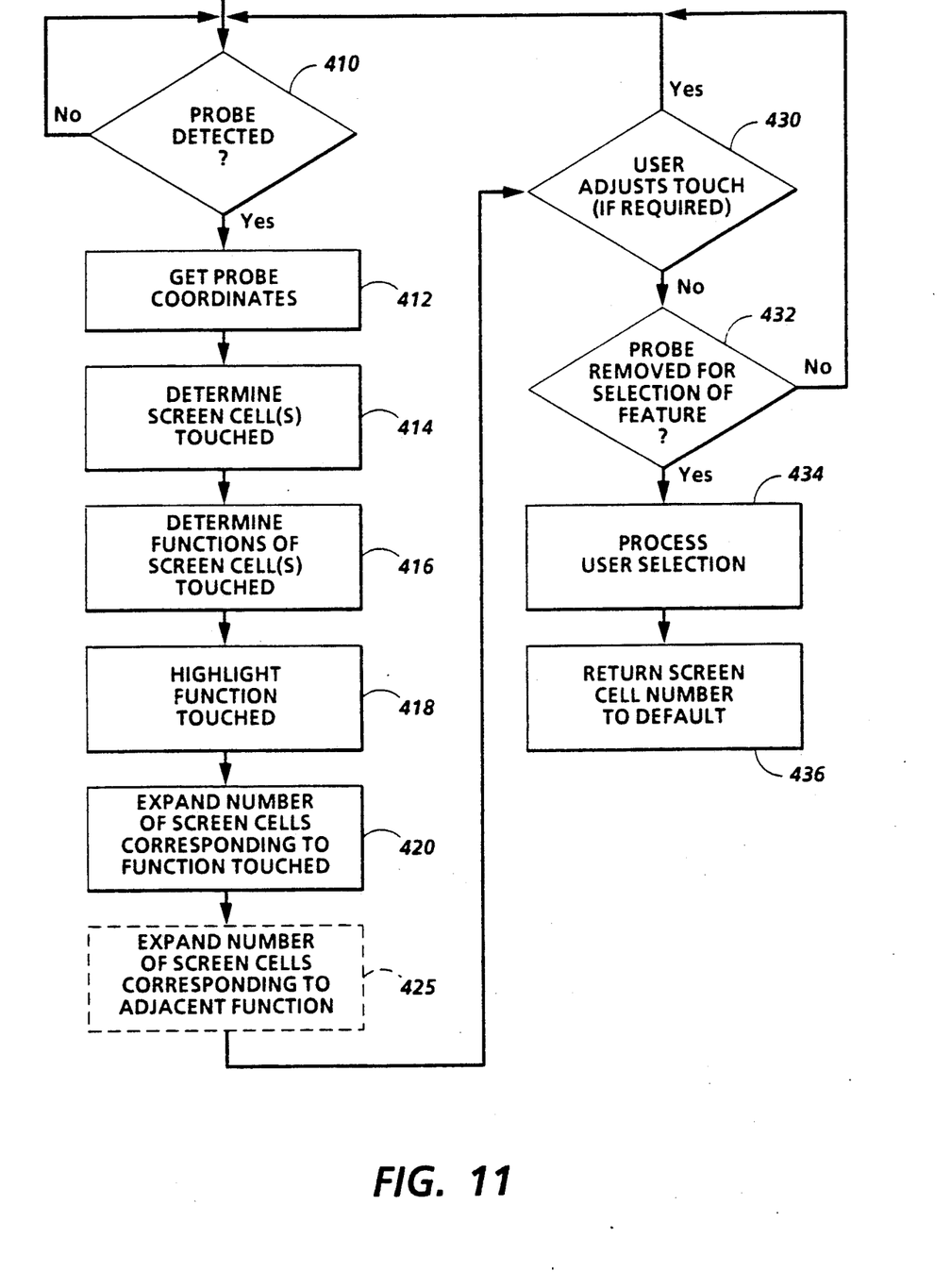
FIG. 11 is a flow chart of the inventive process.

Referring to FIG. 11, which illustrates a flow chart of the control steps followed by the system controller in accordance with the present invention, initially, the user interface signals the system controller that a probe has been detected as indicated by block 410. Upon determining that a probe has been detected, the system controller interrogates the user interface to determine the grid coordinates corresponding to the center of the probe, block 412. Subsequently, the system controller determines which programming screen cell or contact region corresponds to the probe coordinates received from the user interface, block 414, and associates the screen cells touched with a function, block 416. The controller highlights the function corresponding to screen cells touched at block 418. In accordance with the invention, the controller then expands the number of cells and therefore the area associated with the touched functions at block 420. Optionally, a group of adjacent, non-touched functions may be also expanded in size, at block 425. The user will adjust his touch if a wrong touch is made, the larger areas allowing easier adjustments of selection between touch areas. Upon making a selection, detected at block 432, the user selection is processed at block 434. Upon completion of feature selection, the touched areas returns to a default size.

It will no doubt be appreciated that, in association with the change of size of the touch area, the corresponding image or icon may also be changed in size, to conform with the new touch area size. As the described embodiment illustrates, this is not required.

It will no doubt be appreciated that numerous changes and modifications are likely to occur to those skilled in the art, and it is intended in the appended claims to cover all those changes and modifications which fall within the spirit and scope of the present invention.

We claim:

1. A touch sensitive user interface system including:
  a display screen for displaying a plurality of images representative of selectable options;
  touch sensitive means for detecting the presence of a probe in contact with the display screen;
  control logic, responsive to the touch sensitive means, for determining the contact position of the probe, and defining for each image representative of a selectable option, a first contact area of predetermined size, over which contact with the probe selects the option; and
  said control logic, responsive to detection by the touch sensitive means, expanding the size of said first contact area, to allow selection thereof without contacting any adjacent contact areas, and upon completion of option selection, returning the expanded contact areas to said predetermined size.

2. The system as defined in claim 1 wherein a plurality of contact areas generally near the first contact area each have a predetermined size prior to probe contact in the first contact area, and said control logic, responsive to detection by the touch sensitive means at the first contact area, expands the size of said plurality of contact areas to allow selection of any thereof without contacting any other contact areas.

3. The systems as defined in claim 1, wherein the predetermined area is expanded about a center at the contact position of the probe.

4. A touch sensitive user interface system including:
a display screen for displaying a plurality of images representative of selectable options;
said display screen having associated closely therewith a plurality of light source and light detector pairs arranged with respect to the display screen and defining an array of detection cells thereover, said light sources and light detector pairs arranged to detect impingement of a probe at one or more of said detection cells defined thereby, and produce a detection signal indicative of impingement and the location thereof;
control logic, providing correspondence between one or more detection cells and selectable options, defining for each image representative of a selectable option a group of cells at which contact with the probe selects the option; and
said control logic, responsive to detection of impingement at a first group of cells, expanding the number of cells in said first group having correspondence to a first selectable option, to allow selection thereof without contacting any adjacent contact areas, and upon completion of option selection, returning the expanded contact areas to said predetermined size.

5. The system as defined in claim 4 wherein a plurality of selectable options generally near the first selected option, each have a corresponding number of detection cells prior to probe contact, and said control logic, responsive to detection by the touch sensitive means at the first contact area, expands the number of detection cells corresponding to each of said selectable options to allow selection of any thereof without contacting any other contact areas.

6. The systems as defined in claim 4, wherein the predetermined number of cells is expanded about a center at the contact position of the probe.

* * * * *